United States Patent [19]
Myers et al.

[11] Patent Number: 5,384,571
[45] Date of Patent: Jan. 24, 1995

[54] METHOD OF FORMING RELIEF SURFACES

[75] Inventors: William M. Myers; Keith A. Ramsey, both of Columbus; Paul G. Andrus, Powell, all of Ohio

[73] Assignee: Battelle Memorial Institute, Columbus, Ohio

[21] Appl. No.: 2,580

[22] Filed: Jan. 11, 1993

Related U.S. Application Data

[63] Continuation-in-part of Ser. No. 885,084, May 18, 1992, Pat. No. 5,225,933.

[51] Int. Cl.⁶ ............................................. H01Q 17/00
[52] U.S. Cl. ............................................. 342/4; 342/3
[58] Field of Search ........................................ 342/1-5

[56] References Cited

U.S. PATENT DOCUMENTS 4,883,341 11/1989 Whitehead ...................... 350/276 R

OTHER PUBLICATIONS

3M/Optical Systems Right Angle Backlighting Technology Design Aid [Product Brochure-No Date].
The Infrared Handbook, Office of Naval Research, Department of the Navy, 1985, pp. 2-26 to 2-19, 2-24, 2-25.

*Primary Examiner*—Peter A. Nelson
*Attorney, Agent, or Firm*—Barry S. Bissell

[57] ABSTRACT

A ultrablack article made of a resin containing light absorbing pigments or dyes and its method of manufacture. The surface of the article is provided with light reflecting projections that cause incident light to reflect from the sides of such projections at least twice and preferably at least three times before reflecting from the articles surface. The vast majority of the incident light is thereby transmitted into the article where it is absorbed. The projections are advantageously conical, pyramidal or ridge shaped. The total incident light that reflects from the surface and from the interior of the article is not greater than 0.5%.

The surface can be made by applying cone or pyramid shaped light beams to photoresist stepwise to make cones and pyramids and by scanning to make ridges. Means are provided to transfer such surfaces to more suitable resins and to do so continuously.

8 Claims, 7 Drawing Sheets

METHOD OF FORMING RELIEF SURFACES

GOVERNMENT RIGHTS

This invention was made under contract awarded by the United States Air Force. The United States Government has rights in this invention.

RELATED APPLICATION

This is a continuation-in-part of copending application Ser. No. 07/885,084 filed on May 18, 1992, now U.S. Pat. No. 5,225,933.

FIELD OF THE INVENTION

This invention relates to low-reflectance surfaces, to the fabrication and replication of such surfaces and to applications of such surfaces. One application relates to absorptive or ultrablack articles that reflect virtually no incident light, for example, for use in lining the light paths in telescopes, cameras, interferometers, and the like.

BACKGROUND OF THE INVENTION

In many situations, users of optical instruments wish to line their instruments with a material that reflects very little or no light, so that stray light which might reduce contrast or produce ghost patterns will be absorbed and not interfere with the intended operation of the instruments. In some instances glossy black paint is useful, but it reflects at least 4% of incident light in a specular manner that may produce ghost patterns. Matte black paint also reflects about 4% of incident light, in this case diffusely, so that contrast is reduced. Coatings of extremely fine conducting powders such as lampblack or platinum black often reflect only an imperceptible amount of light, but such coatings are extremely fragile and cannot be touched or cleaned. A different type of material, black velvet has some of the properties desired.

Black velvet is an example of a type of material that owes its deep black appearance to its structure. The fibers that form the pile of the velvet consist of smooth parallel cylinders of rayon, for instance. A ray of light striking a black fiber cylinder at an angle is mostly absorbed, but a few percent of the ray is reflected farther into the pile. There it strikes another fiber and again, it is mostly absorbed. The small amount not absorbed is reflected farther into the pile, strikes another fiber, and so forth, until essentially all of the light is absorbed. Black velvet is not truly ultrablack because incident rays parallel to the pile fibers will strike the support material and a small percentage of the light will be reflected back out. Also, rays that are incident upon the ends of fibers, or upon bent fibers, will be partially reflected, and provide the characteristic sheen of black velvet.

A partial reduction in the light reflected from a picture surface can be made by causing the light to undergo two surface reflections before it reaches the viewer's eye. This approach is used by Whitehead in his "Non-Reflective Graphic Surface Display Device" of U.S. Pat. No. 4,883,341. This device consists of a transparent plate grooved on the top and having its bottom surface in optical contact with the graphic surface being displayed, so that reflections from the graphic surface are eliminated and only reflections from the grooved surface remain. An ultrablack article is not suggested in the Whitehead patent.

SUMMARY OF THE INVENTION

The present invention provides articles having a low-reflection surface (LRS) and method of making such articles. The LRS can be formed with absorbent materials to make ultrablack articles. A typical ultrablack article according to this invention comprises a matrix having a low-reflective surface or LRS and absorbent material in the matrix. Typically the absorbent material comprises carbon black.

The LRS comprises a low reflectivity material that typically reflects less than about 5% of normally incident light and is configured with microscopic relief regions causing incident light to undergo at least two and preferably three reflections thereon before traveling toward the viewer's eyes. Not more than about 0.05% (and preferably not more than 0.02%) of such incident light is reflected away from the article surface no matter what the incident angle thereby eliminating noticeable surface-reflected light. Of course, lowering the reflectivity of the material and/or increasing the number of reflections in the relief structure will lower the total light reflected to the viewer from the surface. Conversely, increasing the reflectivity of the material and/or decreasing the number of reflections in the relief structure will increase the total light reflected.

The LRS typically comprises an array of pyramids, cones, parallel ridges, or approximations thereof, either individually or in combination. These structures may be formed of a tough or rubber-like material so that the surface may be handled or cleaned without damaging it. The structures may be circular in cross section or they may be triangular, square, or hexagonal and form pyramidal projections. Their bases may form regular polygons or they may be more or less irregular. The heights of the structures, the angle of their apexes and the overall sizes may be uniform or more or less variable. Typically every microscopic area on the outer surface of the matrix lies at an angle of between 50 and 85 degrees with respect to the macroscopic surfaces. Apex angles of less than about 45 degrees are preferred for the multiple reflections. In practice, the cone or pyramid arrays are found to reflect less light than a ridge array for the same apex angle, because, in practice, the apexes do return a small amount of light that has not undergone reflections and there is more apex area on a ridge specimen than on a cone or pyramid array specimen.

The distance between any point on each pyramid or cone or approximation thereof and any point on the nearest other pyramid or cone or approximation thereof, in any direction in the array, typically is not more than about 125 microns. For ridges, the distance is typically not more than 250 microns.

Typically the matrix comprises gelatin, or a plastic, resin, or polymer material, including elastomers. The absorbent material is preferably contained in the matrix immediately beneath the outer surface, i.e. in the cones, pyramids and/or ridges.

Incident light that penetrates the LRS surface and is transmitted into the article will be absorbed in the article. We refer to the sum of the glare or light reflected from the surface and the light reflected or scattered from within the article outward as the total light returned to the viewer.

The present ultrablack articles are created by providing the LRS on a light absorbing matrix that will substantially absorb the transmitted light and such that the total light returned to the viewer is less than about 0.5% of the total incident light. The exact quantity of light absorbing dye or pigment addition required will vary with the light absorbing ability of such material including its particle size and the light-reflecting characteristics of the surface structure (i.e. cones, pyramids and ridges).

Carbon black is the preferred light absorbing pigment. To effect the desired absorption, it is preferred to add at least 0.1%, by weight, of such carbon black to a resin. The addition of amounts greater than about 20%, by weight, will have little additional beneficial effect in achieving an ultrablack appearance and may adversely affect the mechanical and physical properties of the material or article being constructed. Other light absorbing pigments, such as black iron oxide, may be used in place of or in combination with carbon black preferably in amounts that are equivalent to carbon black in light absorption (i.e. preferably an amount equivalent to at least 0.1%, by weight, carbon black and desirably no more than about 20%, by weight). These LRS structures may be formed by a novel photoresist process as follows. Collimated light, such as light from a helium-cadmium laser, is focused into a conical beam by a microscope objective lens. The beam is directed through a thin glass substrate into a thick layer of photoresist in such a way that the focal point of the beam is at the surface of the photoresist. The photoresist is exposed either by a step and repeat or a scanning procedure to produce a cone, pyramid or ridge structures. In either case, the volume of photoresist through which the light passes is cross-linked or hardened so that it becomes insoluble in a developing liquid. The developing liquid sprayed on the specimen will dissolve the unhardened resist, leaving behind the desired LRS.

The photoresist structure so formed may produce the desired multiple reflections and low reflectance. However, the optical and mechanical properties are generally not optimal for an ultrablack article. The photoresist could be modified for these purposes, but preferably, the photoresist structure is replicated with more appropriate materials. The replication can be done by using the photoresist structure as a master to form a mold, typically using silicone rubber or electroformed nickel, and casting a plastic or elastomer in the mold. Typically, epoxy plates are cast in the silicone molds or silicone rubber sheets are cast in electroformed nickel molds. Both of these materials can be handled and cleaned without affecting their properties. Even tougher materials can be molded from polyurethane rubber using pressure molding techniques.

The above described method may be made continuous for the production of a strip of a flexible resin which exhibits a desired LRS pattern by pouring an uncured flexible resin into the nip between a rotating heated roll and a supporting roll. The heated roll has an outer surface which is the inverse of the desired LRS pattern. By controlling the parameters of heat, resin curing rate, and dwell time to cure the resin, the heated roll surface is reproduced in the resin strip.

The heated roll utilized in the continuous process may be made by a unique electroforming process. This process consists of the steps of coating the outer surface of a metal cylinder with a layer of photoresist material, selectively photoexposing the photoresist with a focused light beam to produce a photoexposed replica of the low-reflective surface structure facing inwardly in the photoresist layer, applying a resin coating over the layer of photoresist, removing the metal cylinder leaving an intermediate cylindrical body comprising the inner photoresist layer and the outer resin coating, removing portions of the photoresist layer that are not photoexposed to leave the photoexposed replica of the low-reflective surface and the outer resin coating, casting a cylindrical metal roll on the inside of the intermediate cylindrical body such that the photoexposed replica of the low-reflective surface is reproduced on the outside of the cylindrical metal roll, and removing the outer resin and photoresist coatings form the cylindrical metal roll.

DRAWINGS

BEST MODE FOR CARRYING OUT THE INVENTION

The present invention provides ultrablack articles having a matrix layer with a low-reflection surface (LRS) and containing absorbing materials.

Typically, the LRS and the light absorbing materials in the matrix are together sufficient such that less than 0.5%, and preferably less that 0.1%, of the total incident light leaves the article. Carbon black in the range of 0.1–20% (or other known absorbing materials in amounts equivalent to such carbon black) is typically used as the absorber in the matrix.

Figure 1:
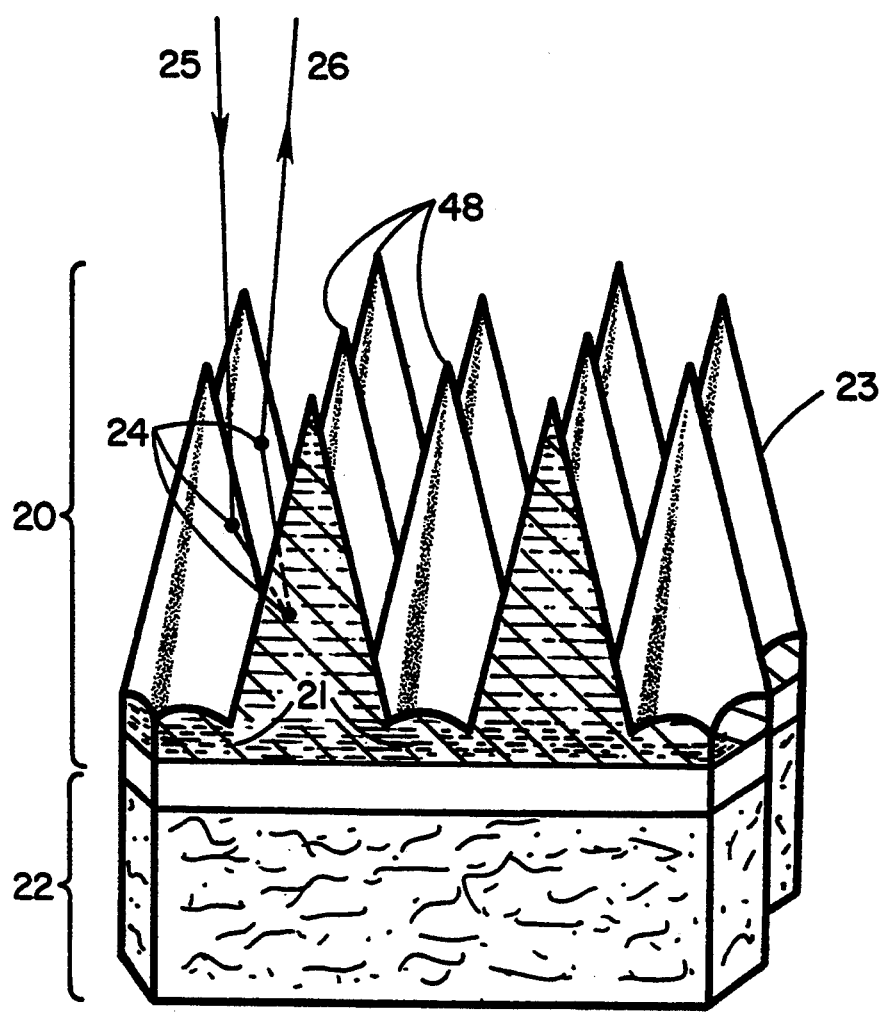
FIG. 1 is a perspective view of a portion of an ultrablack article embodying close-packed cones according to the present invention.

Referring now to FIG. 1, a low-reflection surface (LRS) 23 is shown on a typical article comprising matrix 20 and substrate 22 according to this invention. The LRS surface 23 comprises a low-reflectivity material that reflects less than about 5% of normally incident light and is configured with microscopic smooth cones 48, pyramids and/or ridges to provide a series of at least two and preferably three reflections 24 of any light 25 impinging thereon, before the light travels away from the article at 26. This means that only about 0.05% (and preferably not more than 0.02%) of such incident light is reflected by the outer surface toward the viewer's eyes no matter what the incident angle. Of course, the remainder of the incident light is transmitted into the matrix 20 where it is absorbed or reflected (scattered) back out of the matrix and away from the article. A highly absorbent material 21 is present in the matrix 20 to absorb virtually all of the transmitted light.

We will refer to the "total light returning to the viewer" or away from the article as including the small amount of light reflected from the surface (glare or specular reflection) and the small amount of transmitted light which is reflected or scattered back out of the article from sites within the article. The goal of an ultra-black article is to absorb most of the transmitted light and, typically, the total light returning to the viewer may be reduced to less than 0.5% of incident light.

The outer surface of the matrix typically comprises a relief pattern of an array of pyramids or an array of cones 48 or adjacent sharp ridges and valleys, or approximations and/or combinations thereof. Typically the matrix comprises gelatin or a plastic, resin, or polymer, including elastomers. Polyolefin, polyester, polyether, polyurethane, or silicone materials are preferred. The LRS pattern is typically produced by a molding or embossing operation in which the layer is softened by heat, solvents, or other means, and is pressed against a mold which is the negative of the relief pattern desired. The molded layer is permitted to harden by cooling, polymerization, or other means, to a sufficient extent that it can be detached from the mold without degrading the fine pattern.

Though the relief pattern may be any one of several microscopic projection and depression patterns or a combination of two or more such patterns, we have found an effective pattern is an array of microscopic, smooth, sharp pyramidal projections close packed so that no flat areas remain.

For instance, a plane can be divided into a square grid, with each square covered with a pyramid having four sides rising above the plane to a point. We have found that a structure having pyramids 125 microns on a side and 150 microns high to be a good low-reflecting surface. Since a small fraction of incident light may be reflected directly from the junction lines between pyramids, a better relief structure is one which eliminates the junction lines by making every other square a pyramidal depression rather than an elevation. The same sort of relief structure can be fabricated with triangular pyramids with alternating raised and depressed regions, making another excellent nonreflecting surface. The term "pyramid" is intended to include triangular, square, rectangular or many sided pointed projections in plan view.

Typically every microscopic area on the outer surface 23 of the matrix 20 lies at an angle between 50 to 85 degrees with respect to the macroscopic surface defined by the locus of points on the tips of the cones, pyramids or ridges.

The pyramids, cones and/or ridges, may be modified to have other shapes, arrangements and/or heights. For example, the ridges and valleys may be straight (such as in FIG. 5), or may have other shapes, such as zigzag or smooth curves, such as sine waves. The pyramids, cones and/or ridges may have their sides convex, concave, or partly convex and partly concave. Also the pyramidal and conical surfaces may be intermingled with similar shapes whose apexes are pointed inward to form surfaces that are substantially free of lines parallel to the macrosurface of the article. The height of the individual pyramids, cones and/or ridges may indeed vary uniformly or randomly, which may be of additional benefit in reducing any tendency of the surface to act as a diffraction grating.

Making the Low-Reflection Surfaces (LRS)

The low-reflection surfaces of the invention can be formed directly in working materials by any number of known methods. Mechanical methods such as machining or embossment, and optical methods such as laser cutting are examples of direct methods. However, for mass production of articles incorporating the LRS, the following novel replication method is preferred. It begins with the creation of a positive or negative pattern of the LRS (by one of the direct forming methods), the creation of a negative mold and the casting of the final articles in the mold.

Direct Forming of Positive or Negative, Low-Reflection Surface (LRS) Patterns. It has been found that one way to form the LRS pattern is to deposit a thick layer of negative-working photoresist (photohardenable material) onto a glass substrate and to direct a collimated beam of light through a lens forming a conical point of light which is then directed through the glass substrate and the photoresist material.

If the focal point of the cone is arranged to be at or just below the surface of the photoresist, a small cone of photoresist will be hardened, and will remain on the glass substrate when the unhardened resist is dissolved (or otherwise removed). If the exposure is stepped suitably, an area of the substrata can be covered with slightly overlapping cones to form the structure desired.

Figure 2:
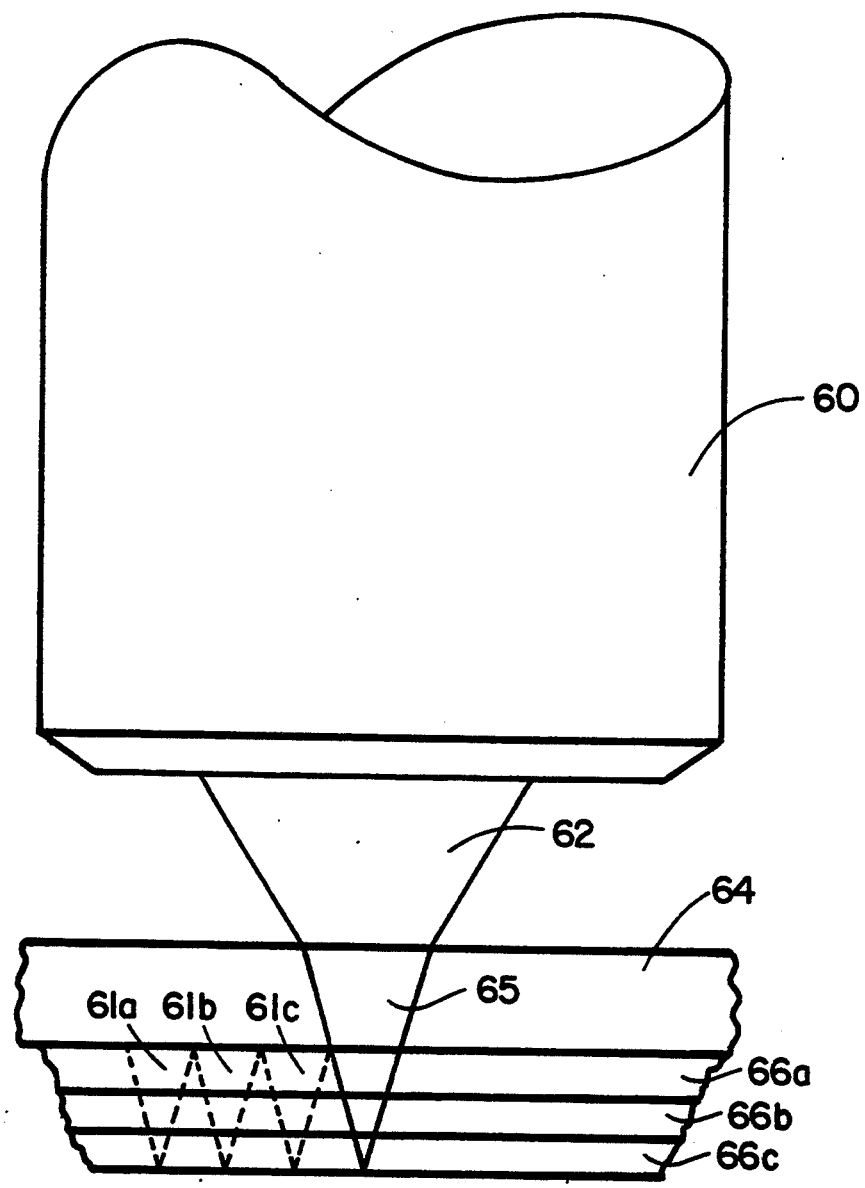
FIG. 2 is an illustrative drawing of a light resolving optic forming a cone shaped light beam penetrating a photoresist coating.

As shown by FIG. 2, microscope objective 60 focuses collimated laser light into cone-shaped light as shown at 62. Light 62 is then used to penetrate transparent substrate 64 as shown at 65 and three layers of a negative photoresist 66a, 66b, and 66c applied to the substrate. By repeating and stepping such penetration, exposed and fixed (i.e. polymerized) cones 61a, 61b, and 61c are formed. The remaining unexposed material is then removed by known means.

The process works well when an HeCd laser is used to produce the beam of light, which is focused by a microscope objective into a triple layer of Riston 1230 (a negative-working photoresist material manufactured and sold by E. I. du Pont de Nemours and Company, Wilmington, Del.) on a microscope cover slip substrate. The angle of the cones can be varied by varying the numerical aperture (N.A.) of the objective. An N.A. of about 0.45 produced cones with good light-trapping characteristics.

The cones produced by this procedure will have a circular cross section (top view) if the beam of light has a circular cross section. The beam cross section can be modified with a mask at the microscope objective to produce cones that have other cross section shapes. Cones with triangular or square cross sections (pyramids) can be produced, as well as many other regular or irregular cross section shapes.

The triangular, square, or hexagonal pyramids can be arranged so that their bases meet in a plane without overlapping. The triangular and square pyramids can also be arranged to overlap in such a way that depressions are formed between pyramids that are the exact negatives of the solid tips of the pyramids. Such arrays have particularly good light-trapping characteristics.

In another embodiment of the present invention a variation of the surface structures described above can be made by smoothly scanning a focused beam of light such as the conical light 65 shown by FIG. 2 (or a pyramid-shaped beam) across the photoresist 64 rather than following the step wise procedure described above. This produces triangular ridges of photoresist that have essentially zero top surface area to directly reflect light, so for the most part, only light that has been reflected several times can escape the surface.

Using the same general procedure, ridges may be formed that cross the first set of ridges to produce square or rectangular or parallelogram-shaped cavities, each of which do a good job of trapping light. Or, the ridges may be made intermittent, to form an array intermediate between a ridge structure and a cone structure.

Two potential advantages of the ridge structure are (1) the fabrication procedure is simpler and can proceed more rapidly than the stepwise exposure needed to produce cones, and (2) for surfaces with ridges in one direction only, the final surface is easier to clean by wiping with a moistened conformable wiper.

Although this description has been made in terms of negative working photoresist and photopolymers (materials that are hardened, or made less soluble, or made resistant to etching, etc., by the action of light) a similar fabrication procedure can be based on thick positive-working resists (materials that are made more soluble, or made more volatile, or made less resistant to etching, etc., by the action of light). If this is done, it is convenient to expose the photoresist layer from the front, rather than through the substrate. In general, such exposure and subsequent development of the photoresist produces a negative relief pattern of cones or pyramids, and it may be desirable to use the photoresist as a mold in which to cast an absorbing resin or other material to produce the final ultrablack surface.

Appropriate negative-working photoresist materials are taught in U.S. Pat. No. 3,469,982 to Jack Richard Celeste entitled "Process for Making Photoresist" which is hereby incorporated into this specification by reference.

Structures that have been photofabricated in photoresist materials may not be highly light absorbing themselves. Such is the case of Riston photoresist because Riston must transmit light to function as a photoresist. To produce ultrablack surfaces from Riston surface structures, a process to replicate such structures in an absorbing medium has been developed. This replication process also enables the mass production of many replicas from a single photoresist master.

Replication (Molding). The pattern replication process is illustrated by FIG. 3a through 3d wherein RTV (room temperature vulcanizing) silicone rubber 70 (or other rubber or resinous material that will vulcanize or set at appropriate low temperatures) is poured over photoresist pattern structure 72 (see FIG. 3a) made as described above. The assembly is then placed under vacuum to outgas any air bubbles that may be trapped between the silicone rubber (or other appropriate material) and the photoresist. The silicone rubber, or other material, is allowed to cure or set. After complete curing or setting, the hardened silicone rubber, or other material, is separated (FIG. 3b) from the photoresist, leaving an extremely accurate inverted replica or mold 74 of the original structure. Many such replicas can be produced from a single photoresist array.

Figure 3A:
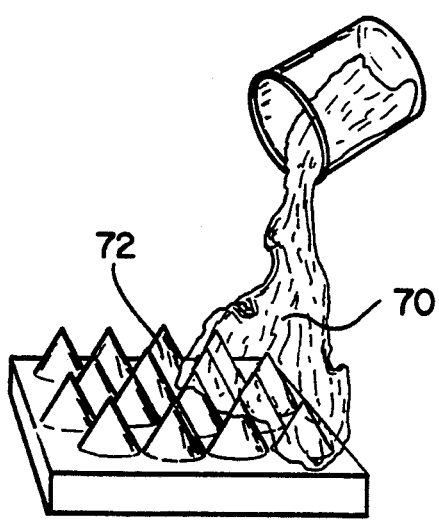
FIGS. 3a–3d are illustrative perspective drawings showing a stepwise procedure for replicating a photoresist structure.
Figure 3B:
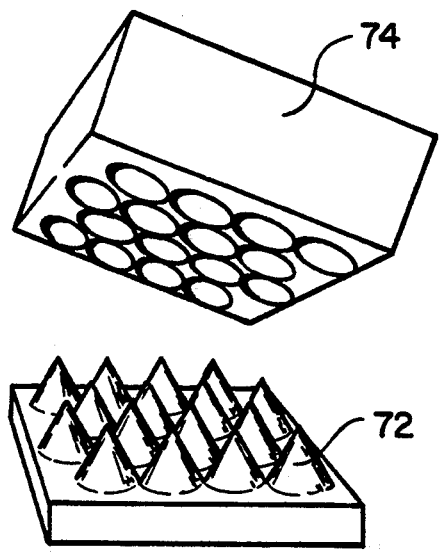
Figure 3C:
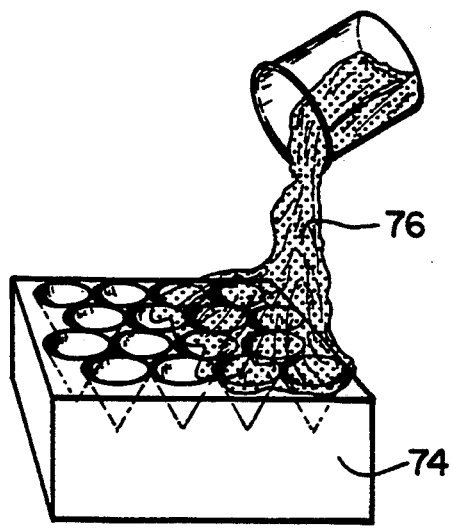
Figure 3D:
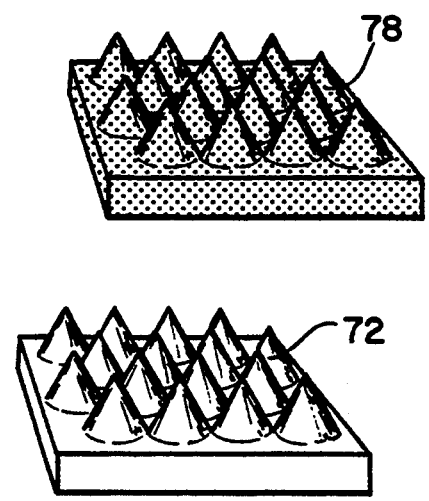

The inverted replica 74 can be used as a mold for casting various media 76 which are poured over the mold 74 (see FIG. 3c) to form LRS articles 78. The casting material 76 may be, for example, an epoxy or a sol-gel. The cast material is outgassed under vacuum to remove trapped air bubbles before hardening and removal from the mold. LRS article 78 is an exact replica of the photoresist original 72 (FIG. 3d).

Surfaces having a microscopic relief pattern that greatly reduces reflections can be molded in a variety of plastic materials. We have molded such surfaces in polyurethane rubber principally because we like the toughness of the rubber and the fact that when it is deformed by a fingernail, or other sharp object, it quickly returns to its original shape and does not show any permanent deflection. We have also molded structures of this sort in heat moldable nylon materials, in polyethylene materials, and in silicone rubber materials. Silicone rubber materials can be used in a heat curing cycle rather than just a thermoplastic molding cycle. The final silicone rubber product is not as tough as some polyurethane rubbers, but a tough grade of silicone rubber might be devised that would be comparable to polyurethane. Other families of plastic materials also might be used in a heat curing cycle. There are grades of heat-curable, gum rubber that are very nearly colorless and clear, and might be used in forming a satisfactory coating.

The original structures produced in photoresist, such as cones, ridges, pyramids, etc. are not very light absorbing and therefore do not exhibit low surface reflectance. To produce low reflectance surfaces that are durable and flexible, resin inverted replicas of the photofabricated surfaces are made as described above. To produce flexible resin replicas in the same orientation as the photoresist these replicas are electroplated with a metal. The electroplate is then removed leaving a metal plate structure having an inverted replica of the original surface structure. A room or low temperature curable flexible resin such as a rubber may then be poured onto such surface and allowed to set. After removal, such flexible resin is an exact replication of the original photoresist structure.

To produce low reflectance surfaces that are durable and flexible, black silicone rubber replicas of photofabricated cone and ridge arrays have been made. Carbon black was blended using an ink mill into uncured RTV (room temperature vulcanizing) silicone rubber to produce an absorbing medium. The black silicone rubber was poured over the photoresist structures, outgassed to remove trapped air, and allowed to cure. The cured rubber was removed from the photoresist, leaving an extremely accurate, inverted replica of the original structure. The samples were durable and flexible, while still exhibiting very low reflectance.

To produce rubber replicas in the same orientation as the photoresist original, a photoresist original is electroplated with nickel. The photoresist is then removed or separated from the nickel plate which is now an inverted array of cones, ridges pyramids, etc. RTV silicone rubber containing black pigment (i.e. carbon black) is poured into the nickel array. The RTV silicone rubber is then outgassed and allowed to cure. Upon removing (i.e. peeling) from the nickel structure, the black silicone rubber structure is an accurate replica of the original photoresist structure.

It is also possible to produce a metal mold for casting of LRS articles by electroplating the replicas with a metal. We have used sulfamate nickel electroplating baths because they can produce relatively stress-free layers. Plating is carried out until a thickness of about 125 microns of nickel is obtained. The electroplate is then removed leaving a metal plate structure which is an inverted replica of the original surface structure. A casting material, for example a room or low temperature curable flexible resin, may then be cast on the surface. After curing and removal, the cast material is an exact replication of the original photoresist structure.

Polyurethane rubber materials can be molded with the nickel mold, but a release agent is required. Without the release agent the polyurethane rubber would serve as an excellent adhesive for bonding the LRS to the nickel mold. Various release agents are thin enough and effective enough not to degrade the fine lines, sharp edges, and other details. Some dilute detergent solutions such as Dreft and sodium lauryl sulfate work well. Applying paraffin release layers by a vacuum deposition process is another good way to get an extremely thin uniform release layer on the mold. Some polyurethane materials have release agents compounded in the material so that they can be shaped by metal molds with no need for a separate release agent.

Figure 4:
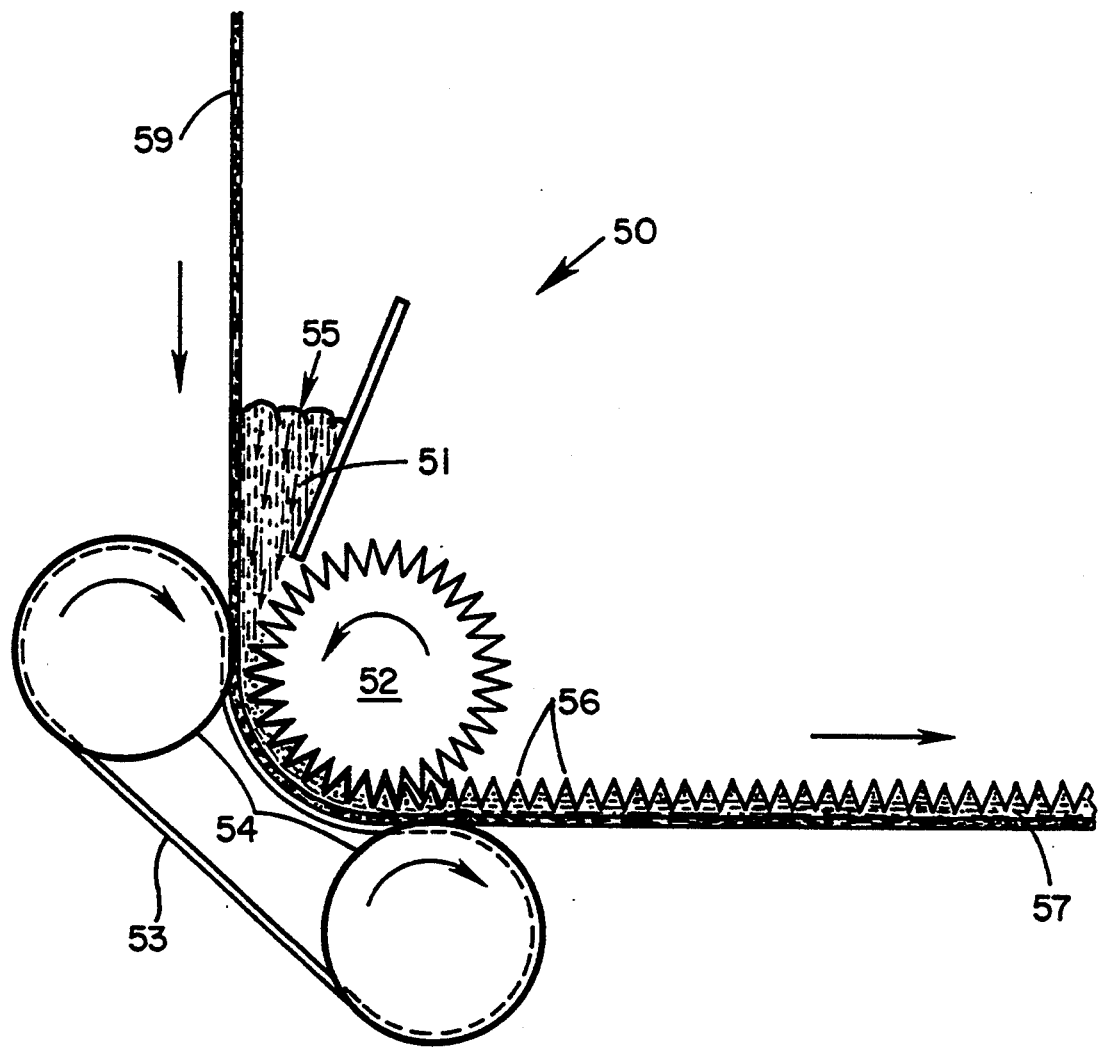
FIG. 4 is an illustrative drawing showing a process for the continuous production of strip with cone shaped surface projections.
Figure 5A:
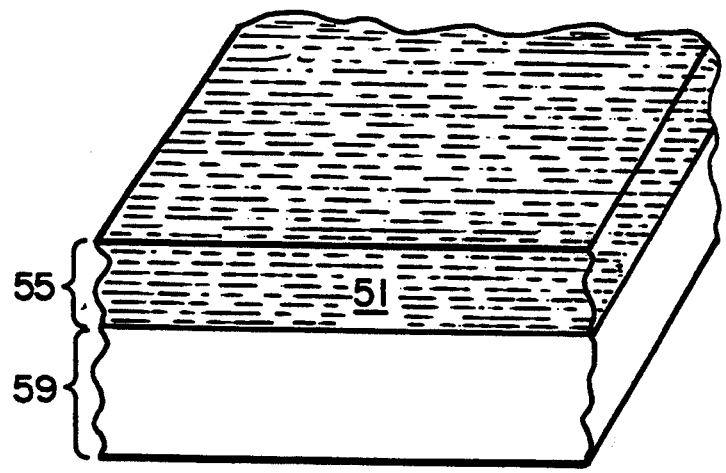
FIGS. 5a and 5b are sectional views of a partly completed article and a completed article made by embossing an article by the continuous production method of FIG. 4.
Figure 5B:
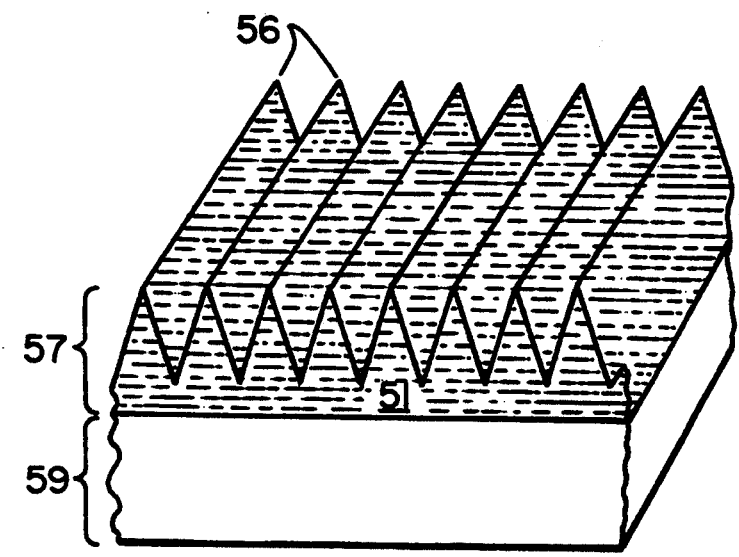

A continuous web of an ultrablack article according to the invention could be produced with the apparatus 50 of FIG. 4 by feeding by a flexible belt material 59 between the heated embossing roll 52 and back up web 53. A formable material, for example a heat-curable resin 55 could be injected into the gap between belt 59 and the embossing roll 52, where it is cured in the (inverse) pattern 56 of the embossing roll 52. The formable material contains a highly absorbent material 51. Absorbent material could also be contained in the belt 59. The output of the apparatus is an ultrablack article having an LRS pattern 56 in cured material 57. Obviously the cured article 57 can be adhered to the belt 59 to form a composite article or stripped therefrom to created a separate article. An article according to the invention made with the continuous method is shown in FIGS. 5a and 5b. The absorbent material 51 is preferably in the formable material 55 deposited on the belt 59. After forming and curing (FIG. 5b) the pattern 56 is formed with the absorbent material 51 in the sharp ridges.

When using a metal roll 52, the above continuous procedure works particularly well with a formable rubber material such as silicone rubber that tends not to adhere to metal surfaces. The process will also work with other vulcanizable or setting materials if a parting agent is sprayed on or wiped on the metal roll. The process can be carried out with an unsupported web (i.e. no belt 59) by using a partially cured rubber as the formable material. However, if this is done greater care must be exerted to feed the material at a suitable rate, and to remove the partially cured material without tearing.

Particular success in effecting the continuous process described above has been achieved for the production of ultrablack surfaces using ink mill blended carbon black into room temperature vulcanizing silicone rubber. This silicone is precoated on the polyimide strip 59 just before the strip contacts the hot patterning roll 52 (having on its surface the inverse of the desired points or ridges). The silicone material is squeezed into the pattern before significant curing of the silicone can take place and is kept in contact with the roll 52 until it is sufficiently cured to hold its shape, typically half the circumference of the roll, after which it is stripped from the roll.

Figure 6A:
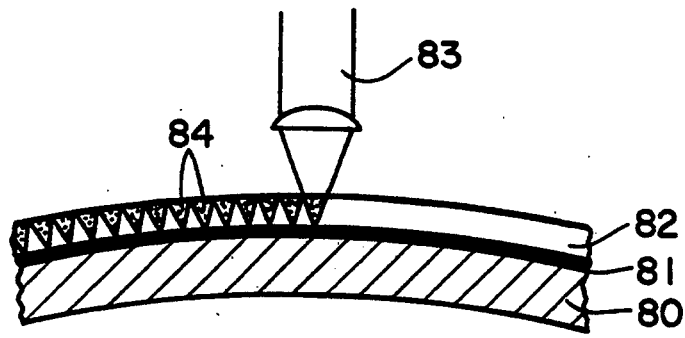
FIGS. 6a–6e are illustrative cross-sectional views of a metal tube rotated helically in respect to a beam of light taken along the helical path of light during a stepwise production of an embossing roller utilized in an embodiment of the present process.
Figure 6B:
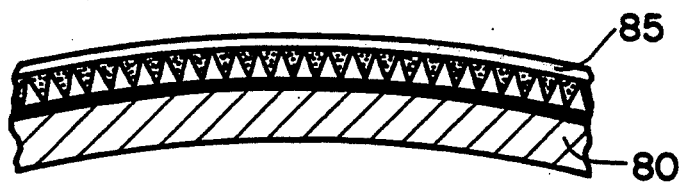
Figure 6C:
Figure 6D:
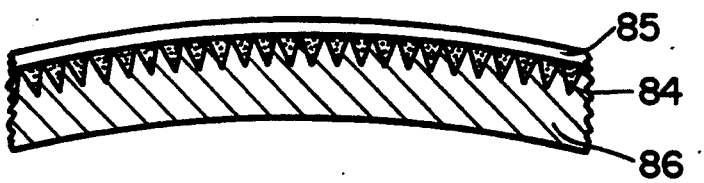
Figure 6E:

Roll Forming. The continuous molding process described above and shown in FIG. 4 requires an embossing roll 52 with a surface inverse of the desired LRS pattern. Such a roll may be fabricated by an electroforming process consisting of the following steps (illustrated by FIG. 6a–6e):

1. A black, light-absorbing coating 81 and a layer of negative-working photoresist 82 (typically Riston 1230), is coated on metal cylinder 80 (typically aluminum).
2. Cylinder 80 is rotated under a conical pencil of laser light 83 (HeCd light collimated and formed by a lens as described above) arranged so that the focal point is almost at the blackened aluminum surface. The light is moved across the surface of the tube helically and in stepwise fashion, to provide inverted cones 84, or in continuous fashion, to provide continuous ridges, in the photoresist 82. FIG. 6a shows a cross-sectional view of a portion of cylinder 80 along the helical path of light 84. Pencil-shaped laser light 83 is shown to be progressing helically and stepwise across photoresist 82 leaving inwardly-pointing, hardened, cone-shaped regions 84.
3. The photoresist is covered with a layer of a resin 85, such as an epoxy resin, and cured (FIG. 6b). The resin should be thick enough to provide rigidity during the next four steps.
4. The metal cylinder 80 is now dissolved, (e.g. aluminum may be dissolved with an acid solution such as dilute HCl) leaving a combination resin/photoresist tube.
5. The photoresist is developed (remove unfixed photoresist) to reveal the surface structures 84 (such as cones, pyramids or ridges), which point away from the resin layer 85 (FIG. 6c).
6. The photoresist is now metallized with a thin layer of metal, preferably by either chemical silvering or vacuum evaporation.
7. A thick metal layer 86, such as a nickel layer, is then electroplated on the metallized inside of the cylinder (FIG. 6d).
8. The outer resin layer 85 and cured, photoresist structure 84 are now removed from the metal layer 86 (a dichloromethane stripping agent may be employed).

The metal layer 86 produced by this procedure is a embossing roll having a LRS pattern on its surface for producing continuous web articles according to the invention as disclosed in FIG. 4.

To accomplish the above eight steps an aluminum tube was employed, the photoresist was Riston, the laser light was HeCd light collimated and resolved into a point with an optical lens, the photoresist was metallized by chemical silvering, the electroplate was nickel, the outer resin coating was an epoxy and the outer resin coating and photoresist were removed from the nickel tube with a dichloromethane stripping agent.

Other ways of making masters and molds do not involve photoresist materials. The grooved or ridged surfaces can be formed mechanically. For example, one can machine, or turn in a lathe, a cylinder having a very fine groove that is cut out with a highly sharpened and polished tool. The grooved cylinder can be nickel, aluminum, or other metal which may be used directly as an embossing roll. Or the groove might be cut in a cylinder of a plastic, wax, or other material commonly used to cut phonograph disks, and an embossing roll replicated from it.

A typical ultrablack article according to this invention is a highly absorbent material having a low-reflection surface. Because of the multiple reflections on the surface, less than about 0.05% of the incident light is reflected from the surface while the remaining light is transmitted into the article and absorbed.

In ultrablack articles consisting of an array of microscopic projections such as microscopic cones, pyramids, ridges, and the like, it may be desirable for many applications for the surface to be both durable and flexible. Structures produced in photoresist and replicated in a rigid plastic such as an epoxy as described above are durable but not flexible. It has been found that flexible black replicas of a flexible resin such as rubber containing black pigment can be made.

Carbon black is the preferred light absorbing pigment. To effect the desired absorption, it is preferred to add at least 0.1%, by weight, of such carbon black to a formable material. The addition of amounts greater than about 20%, by weight, will have little additional beneficial effect in achieving an ultrablack appearance and may adversely affect the mechanical and physical properties of the material or article being constructed. Other light absorbing pigments, such as black iron oxide, may be used in place of or in combination with carbon black preferably in amounts that are equivalent to carbon black in light absorption (i.e. preferably an amount equivalent to at least 0.1%, by weight, carbon black and desirably no more than about 20%, by weight). Individual cones, pyramids, and/or ridges in the surface arrays typically have apex angles of about 45 degrees or less to produce the multiple reflections and light trapping. Such pyramids, cones, and/or ridges may be uniform, uniformly irregular or randomly irregular in height. Preferably, the average height is less than about 250 microns. The distance between any point on each pyramid, cone or ridge and any point on the nearest other pyramid, cone or ridge in any direction in the array is typically not more than about 250 microns.

Figure 7A:
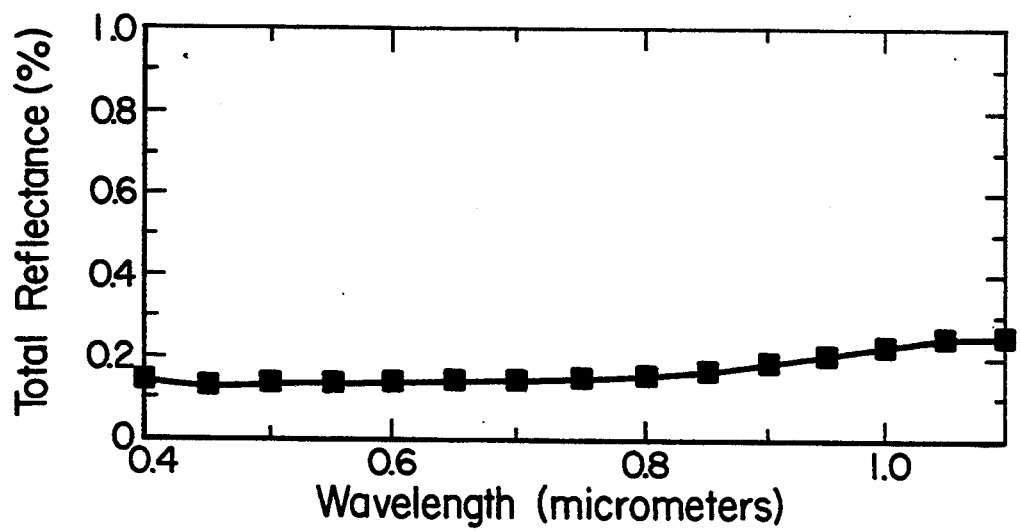
FIGS. 7a and 7b are graphs showing reflectance data on photofabricated pyramid arrays.
Figure 7B:
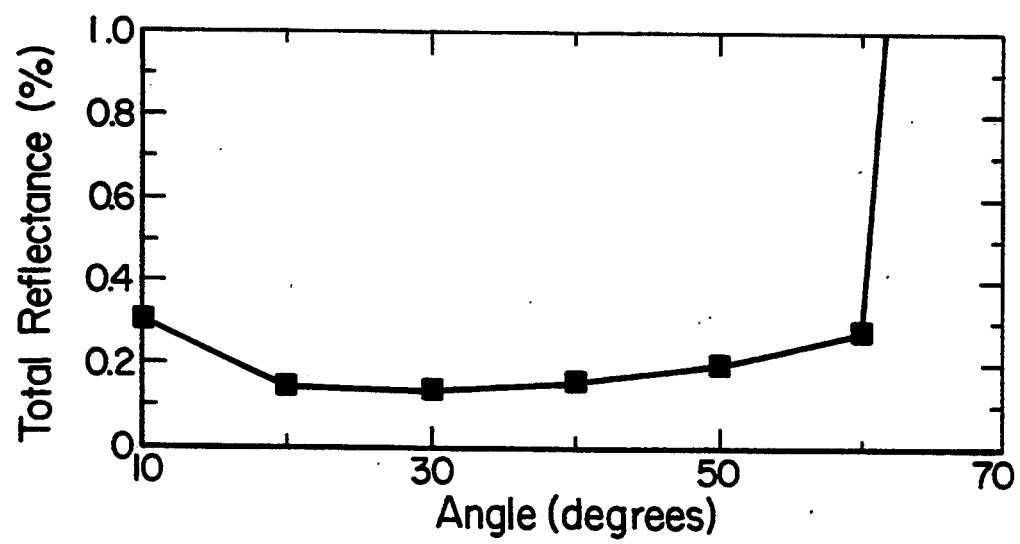

The ultrablack articles made using the photofabrication process have excellent absorptive properties. FIG. 7a shows the total reflectance as a function of wavelength for an array of four-sided pyramids fabricated in carbon black-filled epoxy. The minimum reflectance for this sample is 0.13% in the visible spectrum with an incident angle of 20 degrees. Similar results have been achieved in a sample fabricated in black silicone rubber. FIG. 7b shows the total reflectance as a function of incidence angle for the same pyramid sample. These measurements were taken at a wavelength of 550 nm.

We claim:

1. A method of making a preselected surface structure comprising:
   a. providing a photoresist material;
   b. providing a cone-shaped or pyramidal beam of light capable of penetrating and photochemically reacting the photoresist material to make it removable;
   c. penetrating said photoresist material with said beam;
   d. moving said beam relative to said photoresist to effect said photochemical reaction in the photoresist which renders a portion of said resist removable and a portion fixed in the shape of said surface; and
   e. removing the removable portion of the photoresist.

2. The method of claim 1 wherein said preselected surface is an array of sharp ridges and valleys, an array of pyramids, an array of cones or combinations thereof and said beam of light is laser light, and wherein the method further includes stepwise scanning said beam through said photoresist to form said ridges, valleys, pyramids or cones.

3. The method of claim 2 further comprising providing a transparent substrate, coating said photoresist onto said transparent substrate and directing said beam through said transparent substrate before penetrating said photoresist.

4. A method of forming a rubber replica of a low-reflective surface comprising an array of sharp ridges and valleys, an array of pyramids, an array of cones or combinations thereof comprising:
   a. providing a photoresist material;
   b. selectively exposing said photoresist material to light producing said low-reflective surface in fixed state in said photoresist material;
   c. producing an intermediate replica of said low-reflective surface by removing unfixed photoresist material;
   d. pouring vulcanizing rubber over the intermediate replica;
   e. vulcanizing said rubber into a rubber replica of said low-reflective surface; and
   f. separating said mold from said intermediate replica.

5. The method of claim 4 wherein said rubber is a silicone rubber.

6. The method of claim 4 for forming a rubber replica of a low-reflective surface further comprising electroplating a continuous layer of nickel onto the remaining fixed photoresist material remaining after removal of the unfixed photoresist material, separating said nickel layer from said photoresist producing the intermediate replica of a low-reflective surface in nickel.

7. The method of claim 6 wherein said rubber is a silicone rubber.

8. A method for making an embossing roll for creating a low-reflective surface comprising an array of sharp ridges and valleys, an array of pyramids, an array of cones or combinations thereof in a formable material surface comprising:
   a. coating the outer surface of a metal cylinder with a layer of negative working photoresist material;
   b. selectively photoexposing said photoresist layer with a light beam to produce a photoexposed replica of the low-reflective surface structure facing inwardly in the photoresist layer;
   c. applying a resin coating over the layer of photoresist;
   d. removing said metal cylinder leaving an intermediate cylindrical body comprising the inner photoresist layer and the outer resin coating;
   e. removing portions of the photoresist layer that are not photoexposed to leave the photoexposed replica of the low-reflective surface and the outer resin coating;
   f. casting a cylindrical metal roll on the inside of the intermediate cylindrical body such that the photoexposed replica of the low-reflective surface is reproduced on an outside surface of the cylindrical metal roll; and
   g. removing the outer resin and photoresist coatings form the cylindrical metal roll.

* * * * *